(12) United States Patent
Ido

(10) Patent No.: US 7,859,729 B2
(45) Date of Patent: Dec. 28, 2010

(54) COLOR IMAGE PROCESSING SYSTEM AND METHOD THEREOF

(75) Inventor: Yoko Ido, Yokohama (JP)

(73) Assignee: Canon Kabushiki Kaisha (JP)

( * ) Notice: Subject to any disclaimer, the term of this patent is extended or adjusted under 35 U.S.C. 154(b) by 270 days.

(21) Appl. No.: 12/061,626

(22) Filed: Apr. 2, 2008

(65) Prior Publication Data

US 2008/0246981 A1 Oct. 9, 2008

(30) Foreign Application Priority Data

Apr. 3, 2007 (JP) ............................. 2007-097713

(51) Int. Cl.
*G03F 3/08* (2006.01)
*H04N 1/46* (2006.01)
*H04N 1/60* (2006.01)

(52) U.S. Cl. ................... 358/518; 358/521; 358/523; 358/529; 358/516; 358/1.9

(58) Field of Classification Search ................. None
See application file for complete search history.

(56) References Cited

U.S. PATENT DOCUMENTS

2001/0009464 A1* 7/2001 Kuno et al. ................ 358/1.9
2005/0036157 A1* 2/2005 Takabayashi et al. ........ 358/1.9
2006/0238615 A1* 10/2006 Shigeta ....................... 348/98

FOREIGN PATENT DOCUMENTS

| JP | 10-200773 A | 7/1998 |
|----|-------------|--------|
| JP | 2006-81080 A | 3/2006 |

OTHER PUBLICATIONS

Visual C++ .Net Controls: The Combo Box FunctionX, Inc., (c) 2003.*

* cited by examiner

*Primary Examiner*—Twyler L Haskins
*Assistant Examiner*—Barbara D Reinier
(74) *Attorney, Agent, or Firm*—Rossi, Kimms & McDowell LLP

(57) ABSTRACT

The present invention is to provide an image processing system and the method thereof capable of maintaining gradient characteristics near a black point of an output image, when performing color matching in a color printer, even if a source profile has a lower minimum lightness value of output color gamut. In the present invention, when a condition is matched by comparing the minimum lightness points of the source profile and output color gamut, a correction color conversion table is generated by correcting the minimum lightness point of the output color gamut to a correction target value set in advance. Color conversion is performed for an input image using the correction color conversion table.

19 Claims, 17 Drawing Sheets

FIG.6

| LEVEL | L_correct |
|---|---|
| 1 | minL_dst |
| 2 | minL_dst−2.5 |
| 3 | minL_dst−5 |
| 4 | minL_dst−7.5 |
| 5 | minL_dst−10 |

FIG.13

COLOR IMAGE PROCESSING SYSTEM AND METHOD THEREOF

BACKGROUND OF THE INVENTION

1. Field of the Invention

The present invention relates to a color image processing system and a method thereof, more specifically, it relates to a color image processing system and a method and a program thereof, which relate to a color correction technology for a printer having a color gamut smaller than that of an output machine to be a target.

2. Description of the Related Art

In a color management for an image processing system utilizing various devices, as one of data which plays an important role, there is a color profile. The color profile describes the color reproduction characteristic of the device, and is used in color matching processing for causing the output color of the device to be a desired color. As one of the standards of a general color profile, a profile standardized by ICC (International Color Consortium) is well known, and used normally in color matching processing.

Recently, as an ink-jet system printer and an electrophotographic printer have spread, a color management technology has been popular. A user can obtain an output appropriate for the object of the user, by setting a profile depending on the application of the output and selecting an optimal matching intent (when matching of different color spaces is performed by shrinking and extending them one another, the methods for shrinking and extending them). In particular, in many cases, the electrophotographic printer is also used for a simulation of a printing machine. With regard to the electrophotographic printer, there is a printer in which various types of profiles, such as a CMYK system profile such as Japan Color or DIC, and a RGB system profile such as sRGB or a profile for a scanner, can be specified as a source profile.

There are various sizes and shapes for an output color gamut of a printer, depending on devices. If a color gamut of the source profile and the output color gamut differ from each other significantly, a problem will occur in a color to be output. For example, FIG. 5 is a diagram illustrating the color gamut when the minimum lightness value of the source profile is lower than that of the output color gamut. In the case, the minimum lightness value minL_src of the source profile is smaller than that of the output color gamut minL_dst. Accordingly, there occurs a problem in that all chromaticity points within a range of lightness values of minL_src to minL_dst are mapped on minL_dst, causing gradation collapse.

In order to solve such a problem, a method for mapping after virtually correcting the output color gamut, particularly, as in FIG. 16, a low lightness part can be considered. As one of the correction methods, a method disclosed in Japanese Patent Laid-Open No. 2006-081080 has been proposed. This is a method when the minimum lightness value L* possessed by the color gamut of an output device differs from the minimum lightness value L*' possessed by the color gamut to be a target. In other words, it is a method for performing mapping after virtually extending only the low lightness region of one color gamut having a higher minimum lightness value, and matching the lightness value range with that of the other color gamut.

If such a method is used, the gradient characteristics near a black point when a certain source profile is set, can be compensated. However, as mentioned above, especially, in case of MFP (Multi Function Peripheral: multi-function peripheral equipment), various source profiles can be set. Therefore, the color gamut of each source profile is various, and the difference in the minimum lightness values which can be expressed is also large. Since only a fixed color conversion table can be stored in a destination (printer) profile, some source profiles to be set may cause a problem that the gradient characteristics of a dark part of an output image are poor.

As measures to solve such a problem, a method for changing the correction method of the output color gamut depending on an input image is proposed (refer to Japanese Patent Laid-Open No. 10-200773 (1998)). In Japanese Patent Laid-Open No. 10-200773 (1998), a method is proposed, which detects the maximum value and the minimum value of lightness component of an input image signal and, before performing interpolation calculation on the lightness component of the input image signal, performs compression processing depending on the maximum lightness value and the minimum lightness value.

However, in Japanese Patent Laid-Open No. 2006-081080, since lightness correction is performed using a weighting function only in lightness direction, it is not possible to address a case in which the shape of the output color gamut of the dark part is distorted. Moreover, since similar correction is performed also in the color reproduction region, the parts except for the dark parts may be corrected similarly, resulting in poor matching accuracy.

Moreover, in Japanese Patent Laid-Open No. 10-200773 (1998), a method is proposed which changes compression processing of Gamut (a color gamut of each of a monitor and a printer etc.) depending on the maximum/minimum lightness values of an input image signal, however, if processing is performed on every input image, long time will be necessary for processing. Moreover, in some images, since color difference should be paid greater attention than gradient characteristics, there is a problem in this method, that such cases cannot be addressed flexibly. Moreover, when the same source profile and the same image are input into a plurality of printers existing on a network as in FIG. 17, due to difference of the output color gamut (Gamut) of each of the printers, it is difficult to obtain output image giving the same impression.

SUMMARY OF THE INVENTION

An object of the present invention is to provide a color image processing system and a method thereof capable of color conversion flexibly dealing with significant concern on gradient characteristics of a dark part or color difference, and correction in which balance of the whole of the output color gamuts is considered.

According to a first aspect of the present invention, there is provided a color image processing system capable of color conversion processing, comprising: an output condition determining means for determining a setting or output condition from an operational part of said color image processing system; a minimum lightness value comparing means for comparing a minimum lightness value of a color gamut corresponding to a source profile and a minimum lightness value of an output color gamut; a correction color conversion table generating means for generating a correction color conversion table in which said output color gamut is corrected, based on said determination result by said output condition determining means and said comparison result by said minimum lightness value comparing means; and a color conversion processing means for performing color conversion processing, based on said determination result by said output condition determining means and said comparison result by said minimum lightness value comparing means, by selectively using a color conversion table before correction of said output color gamut and said correction color conversion table.

According to a second aspect of the present invention, there is provided a color image processing method for a color image processing system capable of color conversion processing, comprising: an output condition determination step of determining a setting or output condition from an operational part of said color image processing system; a minimum lightness value comparing step of comparing a minimum lightness value of a color gamut corresponding to a source profile and a minimum lightness value of an output color gamut; a correction color conversion table generating step of generating a correction color conversion table in which said output color gamut is corrected, based on said determination result by said output condition determining step and said comparison result by said minimum lightness value comparing step; and a color conversion processing step of performing color conversion processing, based on said determination result by said output condition determining step and said comparison result by said minimum lightness value comparing step, by selectively using a color conversion table before correction of said output color gamut and said correction color conversion table.

According to a third aspect of the present invention, there is provided a program, causing a computer to execute each of steps of a color image processing method according to the second aspect of the present invention.

According to the present invention, even when there is a difference between the minimum lightness values of a source profile and an output color gamut, color conversion can be performed by selecting the optimal one of putting emphasis on gradient characteristics and putting emphasis on color difference. Moreover, correction can be performed in which the balance of the whole of the output color gamuts is considered.

Further features of the present invention will become apparent from the following description of exemplary embodiments (with reference to the attached drawings).

BRIEF DESCRIPTION OF THE DRAWINGS

FIG. 6 is a diagram illustrating one example of a driver UI which sets a presence or absence of gradation correction near a black point, according to the embodiment to which the present invention is applicable;

FIG. 13 is a diagram illustrating one example of a correction table based on the setting in FIG. 12 according to an embodiment to which the present invention is applicable;

DESCRIPTION OF THE EMBODIMENTS

Figure 1:
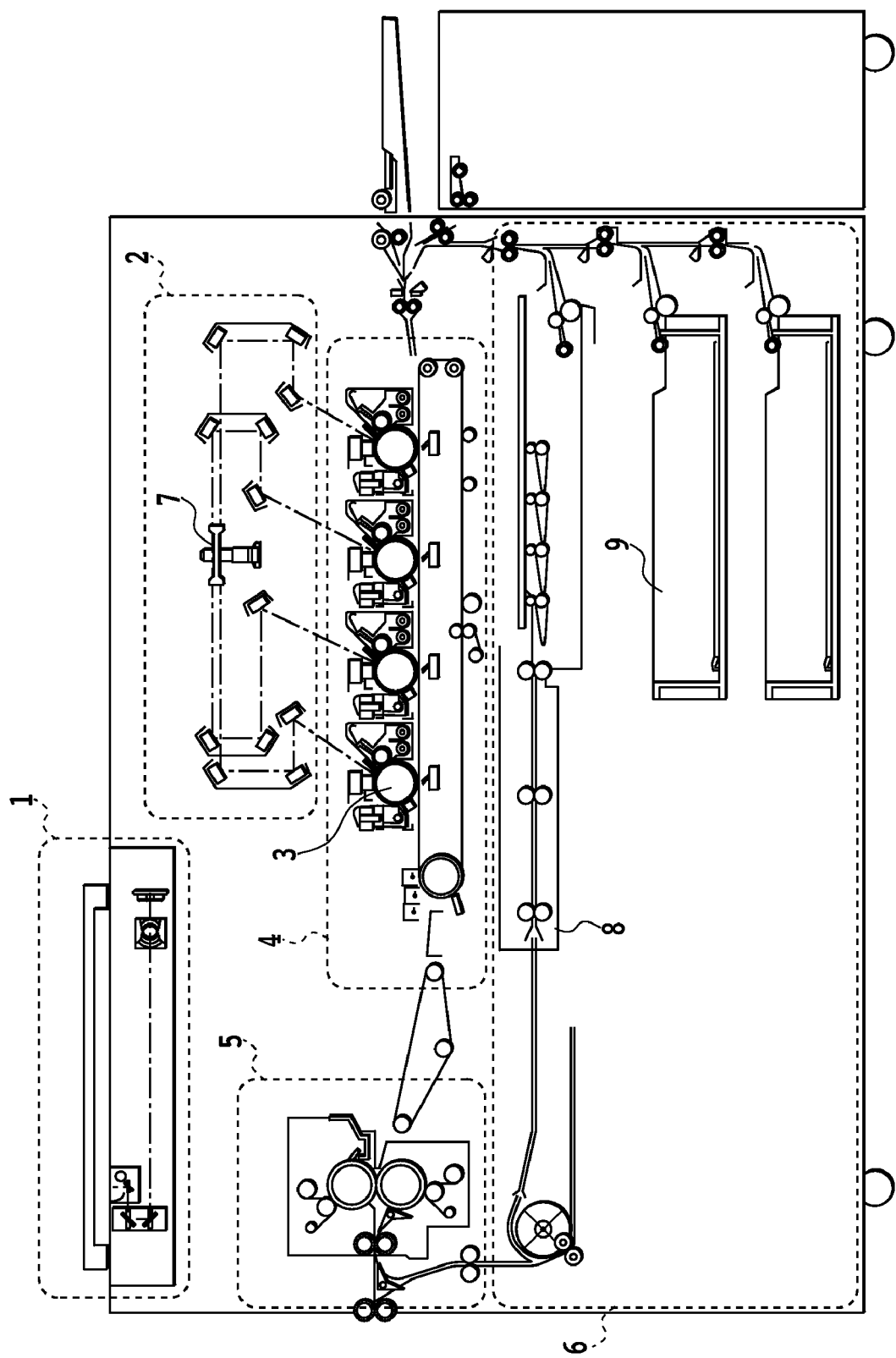
FIG. 1 is a cross-sectional view illustrating a structure of a printer part of a 4D color system MFP of an embodiment to which the present invention is applicable.

Hereinafter, with reference to drawings, an embodiment to which the present invention is applicable will be described in detail. In addition, like reference numerals refer to like parts which have the same function in each of the drawings referred to the present specification.

First Embodiment

<Configuration of Image Forming Apparatus>

FIG. 1 is a cross-sectional view illustrating a configuration of a 4D (drums) color system MFP used for the present embodiment.

The 4D color system MFP (four drums system image forming apparatus) is equipped with a scanner part 1, a laser exposing part 2, a photosensitive drum 3, an image forming part 4, a fixing part 5, a feeding/conveying part 6, and a printer controller which controls these parts and is not illustrated in figures.

The scanner part 1 optically reads an image of an original manuscript, while lightening the original manuscript placed on a manuscript holder, and converts the image into electrical signals to generate image data. The laser exposing part 2 causes light beam such as laser beam, which is modulated depending on the image data to enter a rotating multi-facet mirror (polygon mirror 7) rotating at a constant angular velocity, and illuminate the photosensitive drum 3 as reflected scanning light.

The image forming part 4 drives the photosensitive drum 3 to rotate, charges it using a charger, develops a latent image formed on the photosensitive drum 3 by the laser exposing part 2 with toners, and transfers the toner image onto a sheet. The image forming part 4 collects minute toners remaining on the photosensitive drum 3 without being transferred at that time. The image forming part 4 has four developing units (development stations) of the series of electrophotographic processes. In the four developing units aligned in an order of cyan (C), magenta (M), yellow (Y) and black (K), a cyan station starts image forming, and after a predetermined time, image forming operations of magenta, yellow and black are sequentially performed. By the timing control, a full color toner image without color drift is transferred on a sheet.

The fixing part 5 is configured with a combination of rollers and belts, contains a heat source, such as a halogen heater, and, by means of heat and pressure, dissolves and fixes toners on a sheet on which a toner image is transferred by the image forming part 4.

The feeding/conveying part 6 has one or more sheet storage 9 represented by a sheet cassette and a paper deck, and, in accordance with the instruction of the printer controller, separates one sheet from among a plurality of sheets stored in the sheet storage 9 to convey it to the image forming part 4 and the fixing part 5. The sheet is conveyed, and on which toner images of respective colors are transferred by the above mentioned development station, and finally a full color toner image is formed on the sheet. Moreover, when an image is formed on the both surfaces of the sheet, the feeding/conveying part 6 controls the sheet having passed through the fixing part 5 so as to pass through a both-sided conveyance path 8 which conveys the sheet into the image forming part 4 again.

The printer controller (not illustrated in figures) communicates with an MFP controller which controls the whole of the MFP, and performs a control in response to the instruction of the MFP controller. At the same time, the printer controller (not illustrated in figures), while managing the states of the scanner part 1, the laser exposing part 2, the image forming part 4, the fixing part 5, and the feeding/conveying part 6, instructs so that the MFP can operate smoothly while the whole of the MFP being harmonized.

Figure 2:
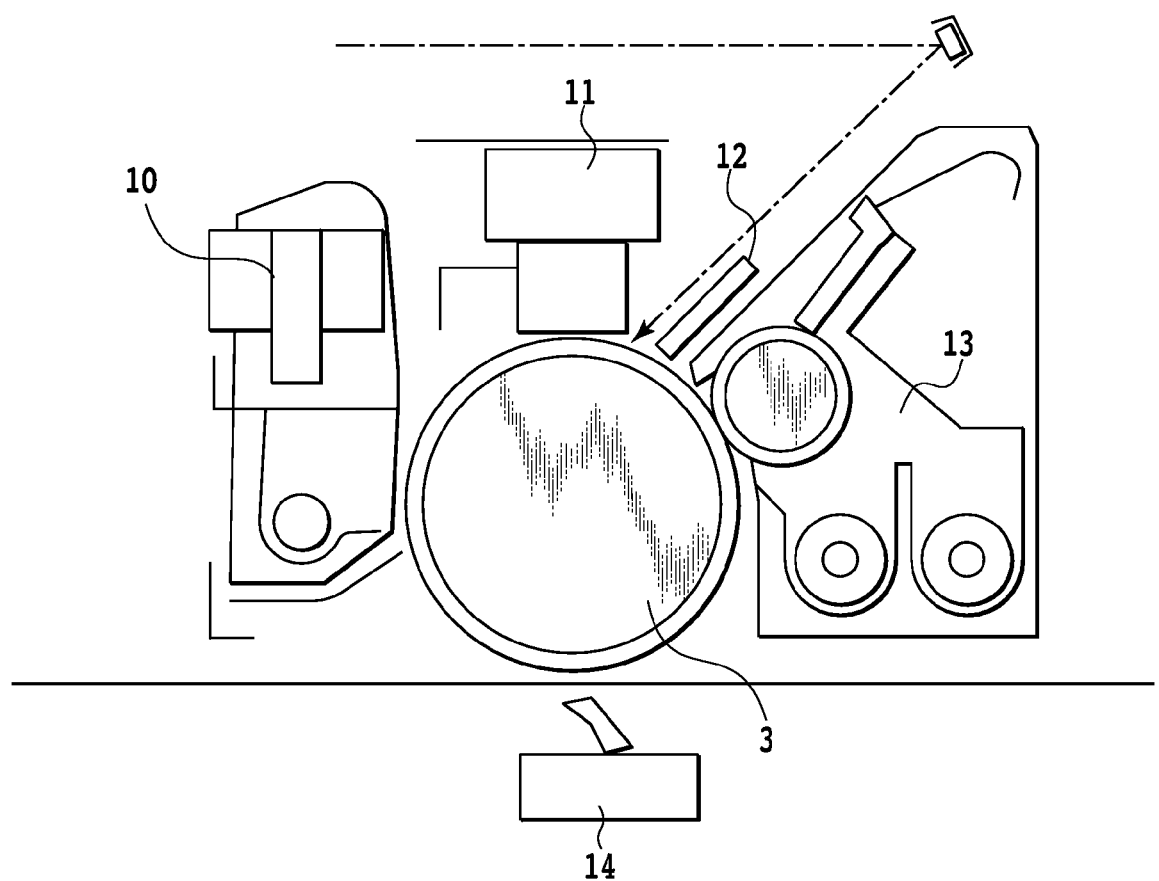
FIG. 2 is a cross-sectional view illustrating a configuration of an image forming part of the 4D color system MFP of the embodiment to which the present invention is applicable.

FIG. 2 is a diagram illustrating one image forming system of a four D color-system MFP. In the MFP of the present embodiment, for each color (Cyan, Magenta, Yellow, and Black), the image forming system is prepared. In accordance without put instruction information from the printer controller (not illustrated in figures), the photosensitive drum 3 is rotated in a direction of right-handed rotation. Hereinafter, from a cleaner unit 10, description will be given sequentially.

The cleaner unit 10 collects toners adhering to the photosensitive drum 3, and cleans the surface of the drum. Pre-exposure LED (not illustrated in figures) is used for eliminating remaining electric charges of the photosensitive drum. A primary charger 11 has a discharge device referred to as a grid, and sets a drum surface potential to be in a ground state. A potential sensor 12 measures surface potentials, such as the potential (Vl) of a part illuminated with laser light, and a primary charged potential (Vd) which is not exposed. The printer controller (not illustrated in figures), after the power source is turned ON, measures the surface potential at a timing, such as when a predetermined number of sheets are output, and changes the light quantity of the laser, charging bias, developing bias, and the like arbitrarily. A developing device 13 forms a toner image on the latent image part. After that, a sheet is fed and conveyed at predetermined timing, electrostatically transferred by a transfer charger 14, and advances to the next color (if final color, to a fixing device). The transferred paper on which the four colors are transferred is sent to a non illustrated fixing device, pressurized and heated to fix a toner image thereon, and then discharged outside the main body.

Here, although the 4D color system MFP has been mentioned as an example, the present invention is also applicable to a one drum system image forming apparatus.

<Configuration of Controller Part and Image Processing Part>

Figure 3:
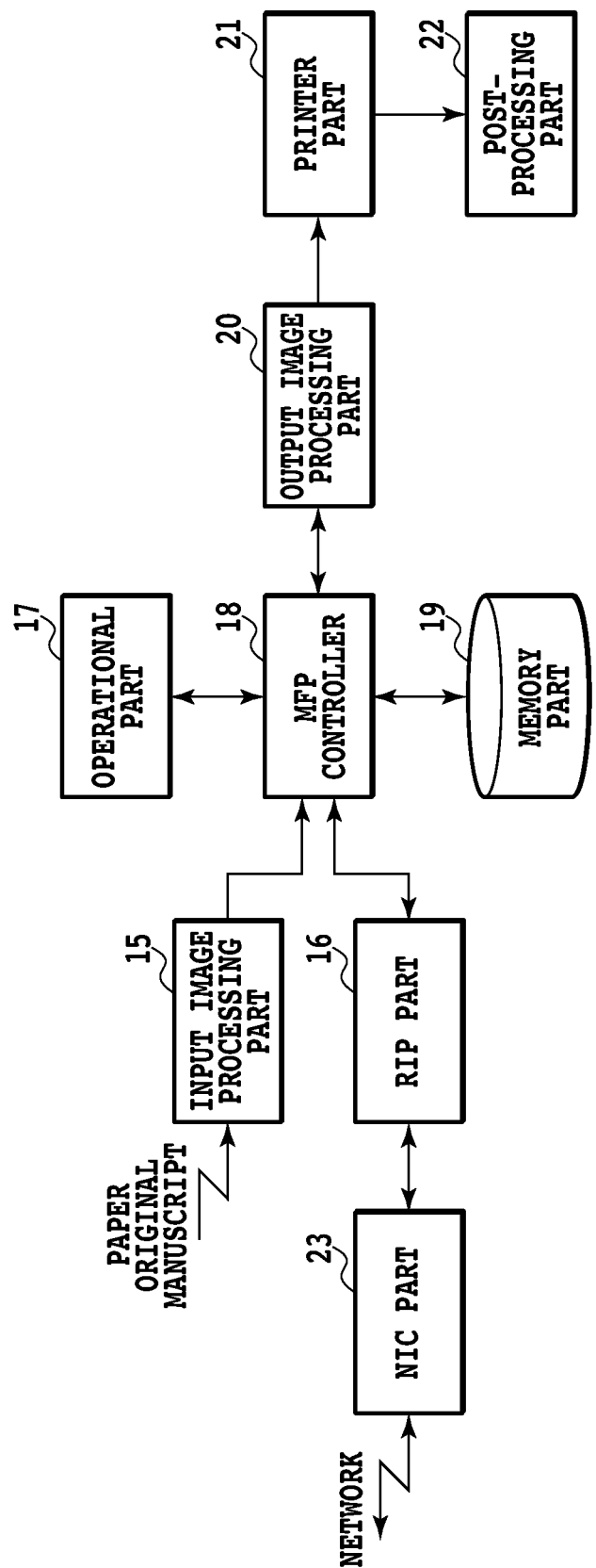
FIG. 3 is a block diagram illustrating a module configuration of the MFP of the embodiment to which the present invention is applicable.

FIG. 3 is a block diagram illustrating the module configuration of an MFP.

In FIG. 3, an input image-processing part 15 reads a paper original manuscript etc. using an image reading device, such as a scanner, and performs image processing on the read image data.

An NIC (Network Interface Card) part 23 gives image data (mainly PDL data) input utilizing a network to a RIP part 16, and transmits the image data and device information inside the MFP outside via the network. The RIP part 16 has a function to decode the input PDL (Page Description Language) data, and perform a RIP (Raster Image Processor) development.

Next, the input image data is sent to the MFP controller 18. The MFP controller 18 plays a role of controlling data to be input and data to be output.

Moreover, the image data input into the MFP controller 18 is once stored in a memory part 19. The stored image data is stored temporarily or is called as needed.

An output image-processing part 20 performs image processing on the image data for printing, and sends it to a printer part 21.

In the printer part 21, a sheet is fed, and the image data generated in the output image processing part 20 is sequentially printed on the sheet. The printed-out sheet is sent into a post-processing part 22, where sorting processing of the sheet and finish processing of the sheet are performed.

Further, although an operational part 17 has a function to select the above-mentioned various flows and functions or operate to instruct, as the resolution of a display device of the operational part 17 becomes higher, the operational part 17 can be used for, such as previewing the image data which presents in the memory part and printing it after the printing is confirmed.

As mentioned above, the MFP has various functions and usages, and examples thereof will be described below (→indicates a flow of data processing).

Copy Function: Input Image Processing Part 15→Output Image Processing Part 20→Printer Part 21

Network Scan: Input Image Processing Part 15→NIC Part 23

Network Print: NIC Part 23→RIP Part 16→Output Image Processing Part 20→Printer Part 21

Box Scan Function: Input Image Processing Part 15→Output Image Processing part 20→Memory Part 19→

Box Print Function: Memory Part 19→Printer Part 21

Box Reception Function: NIC Part 23→RIP Part 16→Output Image Processing Part 20→Memory Part 19

Box Transmission Function: Memory Part 19→NIC Part 23

Preview Function: Memory Part 19→Operational Part 17

<Configuration of Digital Print System>

Figure 4:
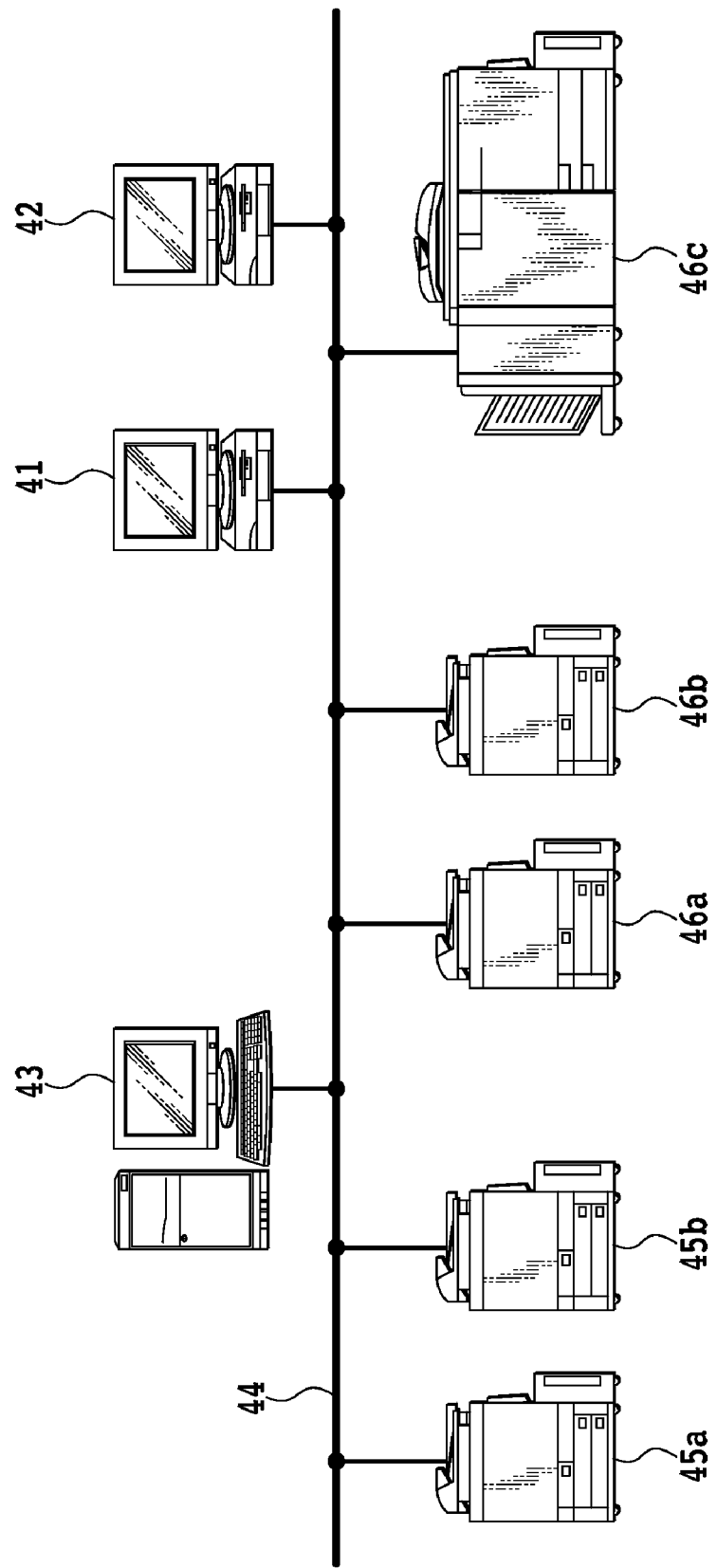
FIG. 4 is a diagram illustrating a system in which a plurality of MFPs of the embodiment to which the present invention is applicable, is present on a network.
Figure 5:
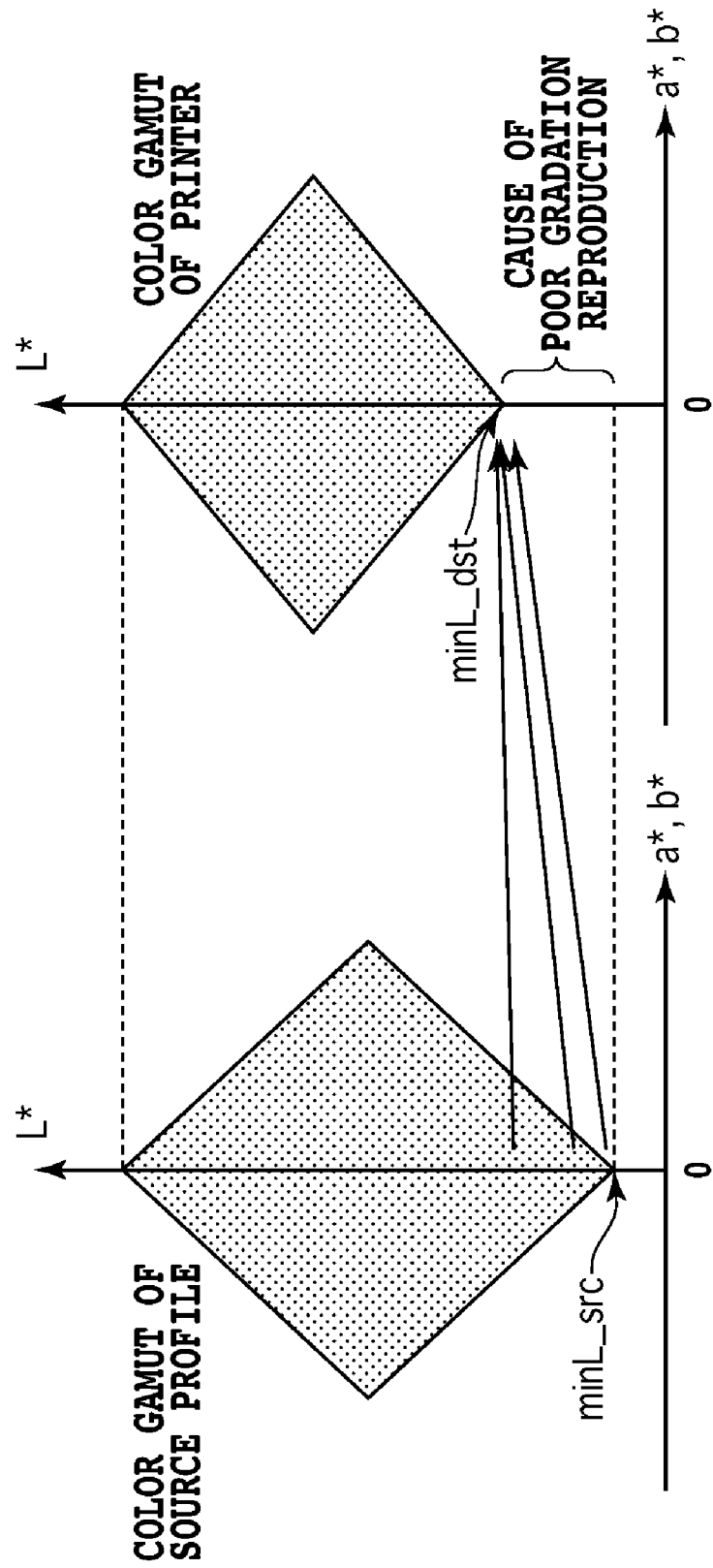
FIG. 5 is a diagram illustrating a poor gradation reproduction near a black point due to a difference between a color gamut of a source profile and an output color gamut.

FIG. 4 is a diagram illustrating an example of the configuration of a network print system assumed in the present embodiment.

Here, a print server 43, client PCs 41 and 42, color MFPs 46a to 46c as mentioned above, and white and black MFPs 45a and 45b, which are connected to a network 44, are present, respectively. The plurality of MFPs constitutes a digital print part in FIG. 4. The client PCs have a function as a color image processing system.

The print server 43 has two roles. A first role is to transmit and receive information to and from the outside of the digital print part, and, first, image information and setting information etc. of an input job are input into the print server 43, and when the job is completed, the print server 43 informs the outside of information such as a status. A second role is to manage and control the inside of the digital print part, and a job input from the outside and a job occurred inside the digital print part, are uniformly managed by the print server 43. The print server 43 can not only monitor the statuses of all devices and all jobs which are present inside the digital print part, but also perform control of, such as job pause, setting change, and printing restart, or duplication, movement, and deletion of a job.

The client PCs 41 and 42 have a role to edit an input application file, instruct printing, or put in a print-ready file, and a role to assist monitor and control of the devices and jobs managed by the print server 43.

Figure 14:
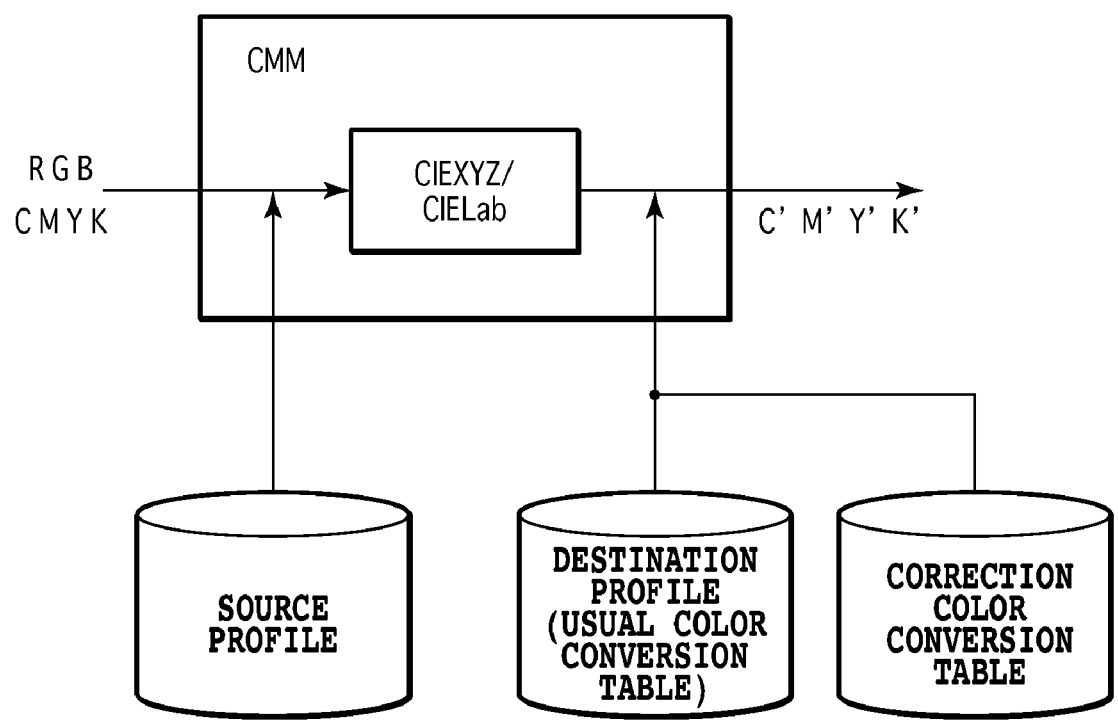
FIG. 14 is a diagram illustrating a flow during a color management processing of an embodiment to which the present invention is applicable.
Figure 15:
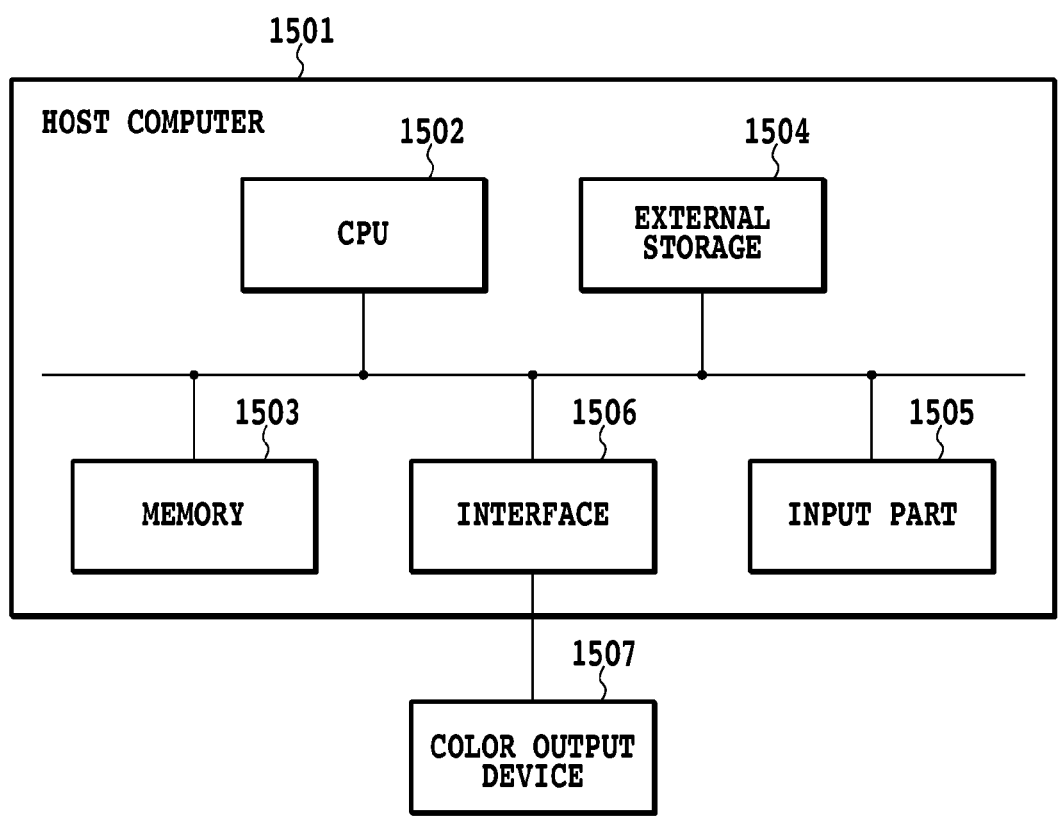
FIG. 15 is a block diagram illustrating a configuration of a color image processing system of an embodiment to which the present invention is applicable.
Figure 16:
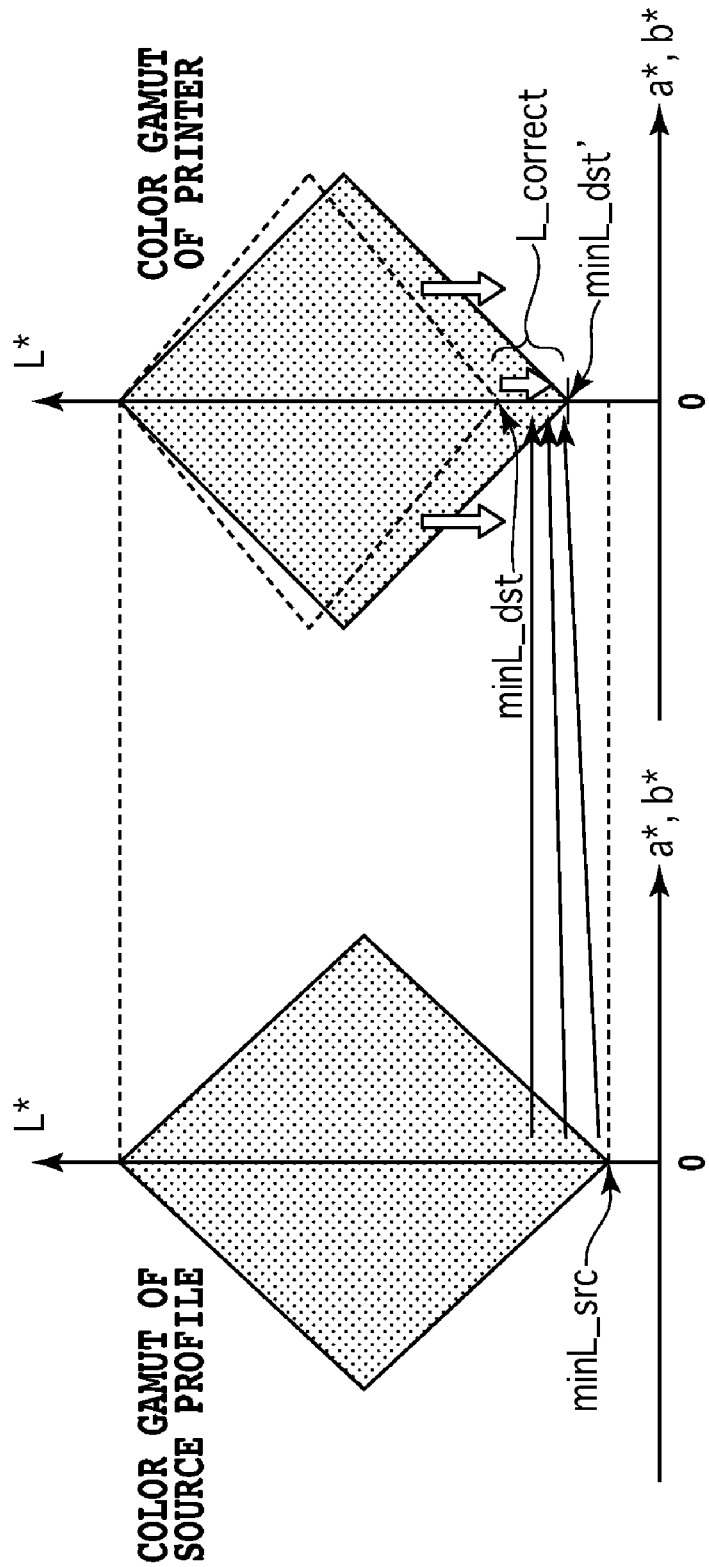
FIG. 16 is a diagram illustrating an image of the correction result of a conventional output color gamut.
Figure 17:
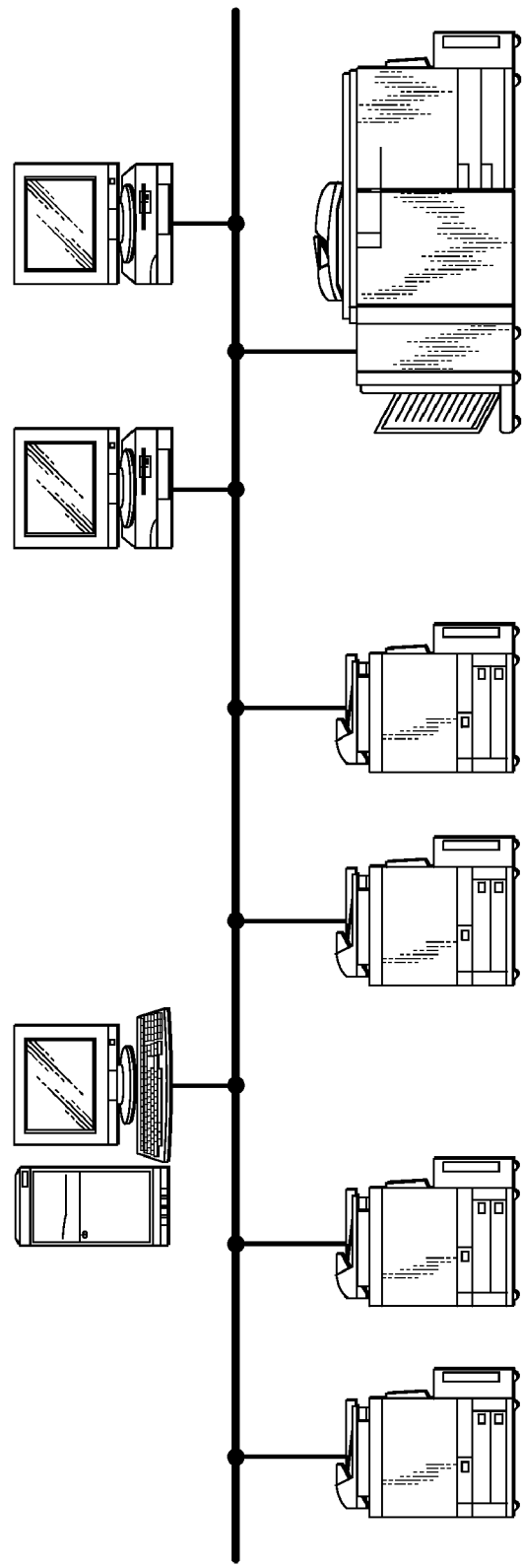
FIG. 17 is a diagram illustrating a system in which a plurality of conventional MFPs is present on a network.

FIG. 15 is a block diagram illustrating the configuration of a color image processing system of an embodiment to which the present invention is applicable. Specifically, there is illustrated an example of the configuration of the client PC 41 etc. which has a function as a color image processing system. In FIG. 15, a host computer 1501 has a CPU 1502, a memory 1503, an external storage 1504, an input part 1505, an interface 1506 to the outside, and the like. CPU 1502 executes programs (a printer driver, RIP, a color profile generating utility program, and the like) stored in the memory 1503, and thereby achieves a processing procedure described below with reference to FIG. 8 etc., a color matching described below with reference to FIG. 14, and the like. The programs are memorized in the external storage device 1504 and loaded from the external storage device 1504 to the memory 1503. Moreover, an ICC profile is also memorized in the external storage device 1504.

The input part 1505 is connected to a pointing device such as a mouse and an input device such as a keyboard (not illustrated in figures), and represents an interface of the input device schematically as a whole. The interface 1506 represents an input/output interface to the outside schematically as a whole. The host computer 1501 is connected to a color image output device 1507, another non-illustrated external device, and a network such as a LAN, through the interface 1506. The color image output device 1507 is a color laser printer, ink-jet printer etc. or MFP etc. of the present embodiment. The other non-illustrated external devices are a scanner, a digital camera, a monitor, a color sensor, and the like. The host computer 1501 transmits an image data subjected to image processing by, for example, a printer driver to the color image output device 1507, and causes it to be printed and recorded.

<Description of Operation>

Next, in the configuration described above, the operation thereof will be described.

Figure 8:
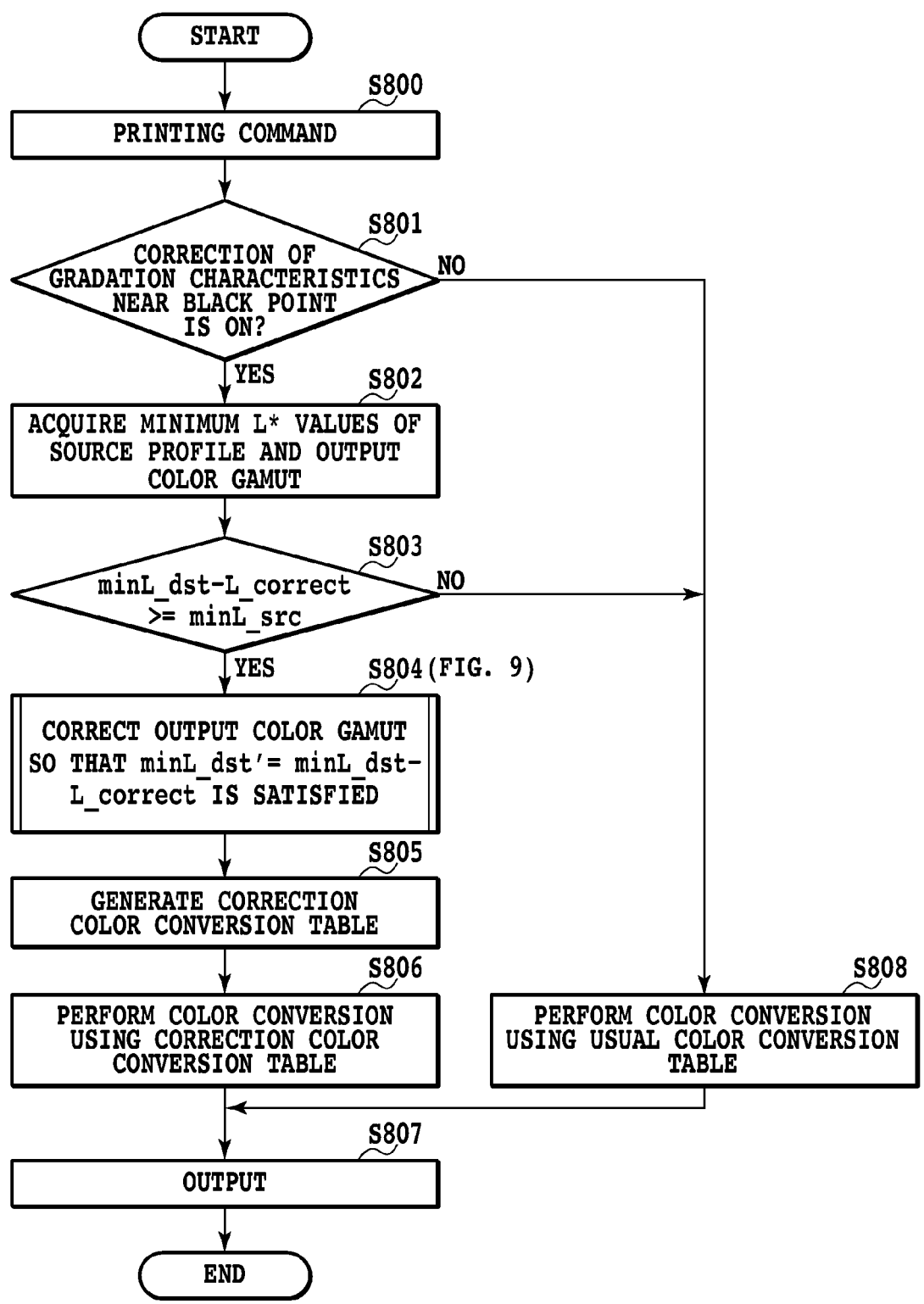
FIG. 8 is a flowchart of a main processing of a first embodiment to which the present invention is applicable.

FIG. 8 is a main flow chart illustrating the color conversion processing of a color image processing system of the present embodiment. The processing procedure illustrated in FIG. 8, is performed such that CPU 1502 of the host computer 1501 in FIG. 15 described above reads out and executes the color profile generating utility program loaded on the memory 1503.

At Step S800, CPU 1502 of a certain client PC connected to a network as in FIG. 4 sends a printing command to a printer (color MFP 46a or 46b) with a configuration as in FIGS. 1, 2 and 3, and advances to processing of Step S801.

At Step S801, CPU 1502 determines whether setting to maintain the gradient characteristics near a black point is made or not. Parts where the setting is made include the driver UI (user interface) of a PC screen and the panel of the printer body to which the printing command is sent.

Figure 6:
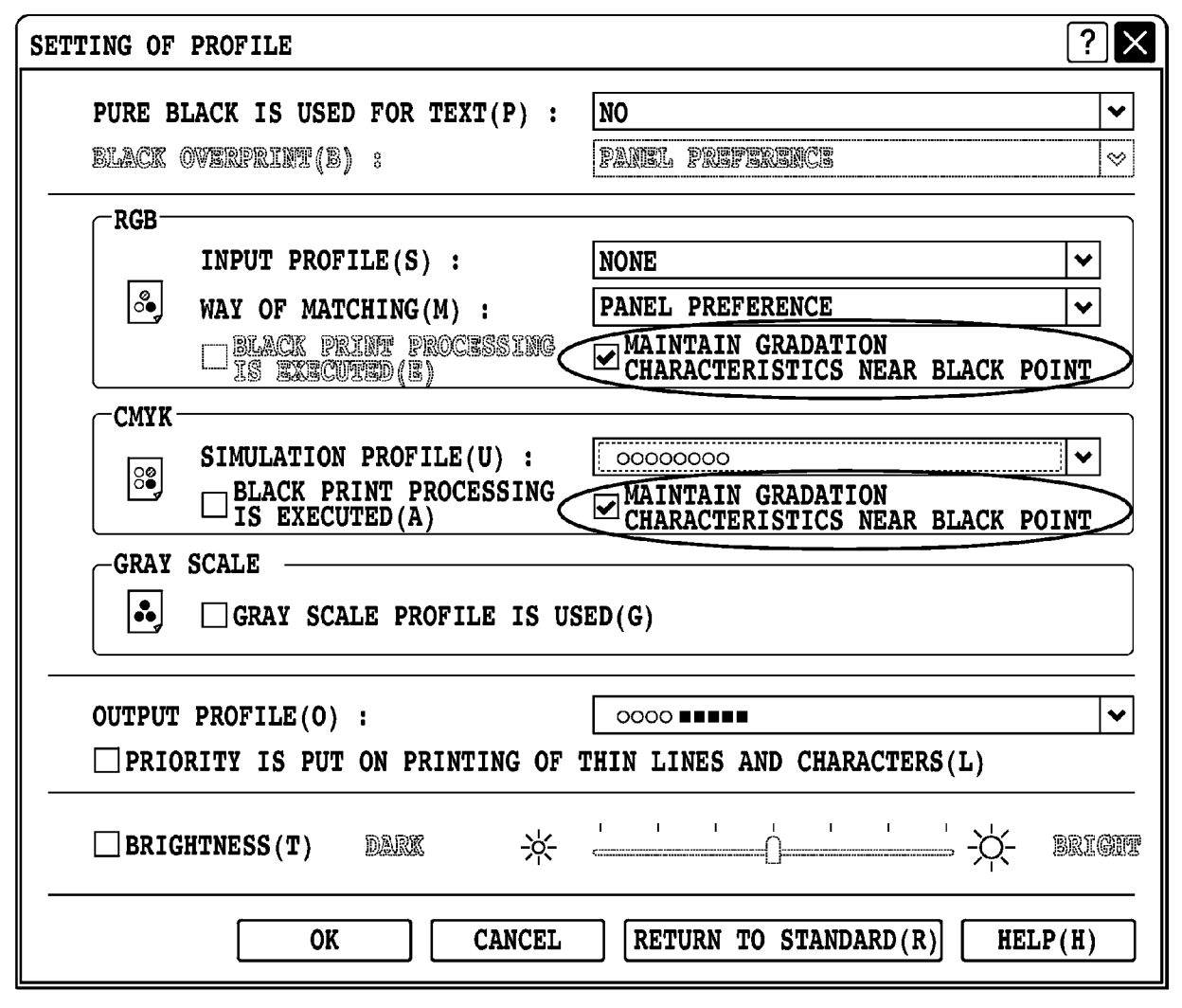

FIG. 6 is a diagram illustrating an example of the PC screen of the driver UI of a printer (MFP) in which whether or not the gradient characteristics near a black point are maintained can be set. By checking "maintain gradient characteristics near a black point" in FIG. 6, color management processing can be applied, in which color reproduction applying the gradient characteristics of a dark part can be obtained. Conversely, if the check is deactivated, color management processing will be applied, in which although the gradient characteristics tends to be degraded, the color difference becomes smaller. The present embodiment is characterized in that the settings can be selected depending on the printing application of a user.

Figure 12:
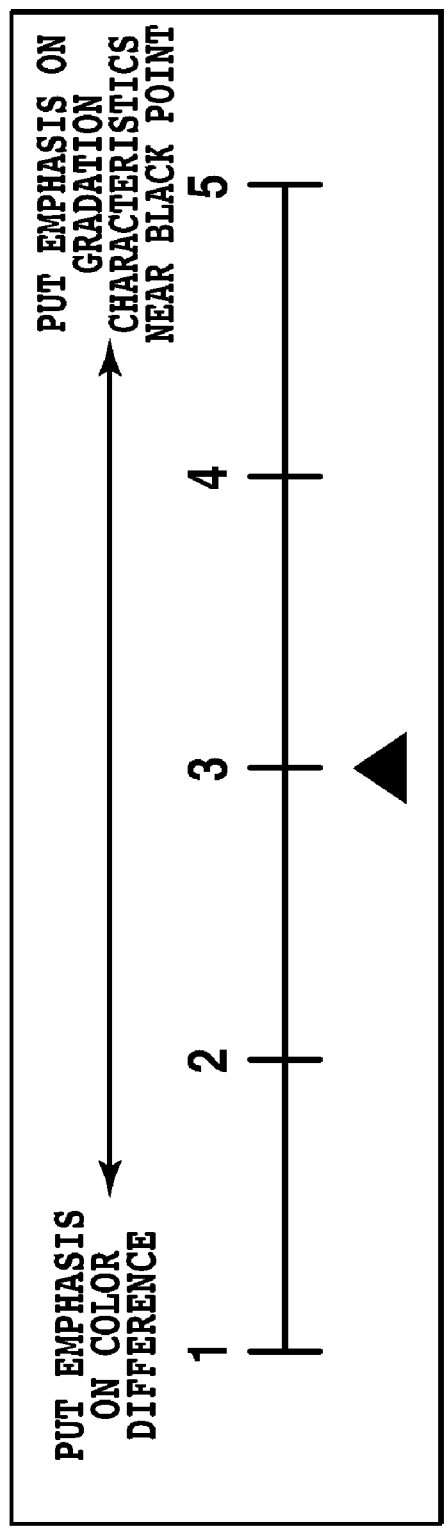
FIG. 12 is a diagram illustrating one example of a UI which sets the level of gradation correction near a black point according to an embodiment to which the present invention is applicable.

In addition, although in FIG. 6 only two settings of ON and OFF can be selected by checking, as its alternative embodiment, as in FIG. 12, it is also possible to provide such a setting screen that can change the degree of the gradient characteristics maintenance processing.

Figure 7:
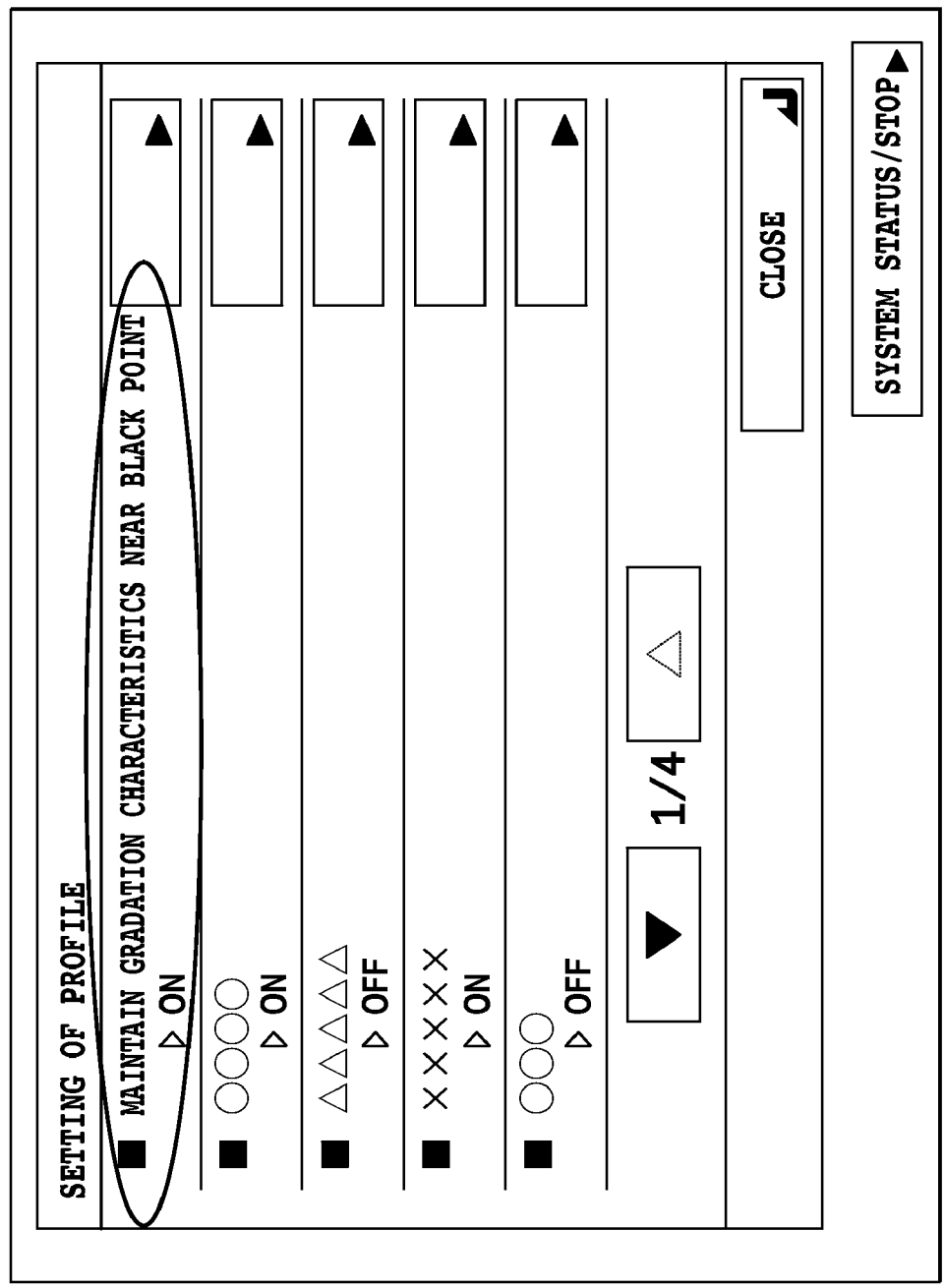
FIG. 7 is a diagram illustrating one example of a main body panel which sets presence or absence of gradation correction near a black point according to the embodiment to which the present invention is applicable.

On the other hand, FIG. 7 is a diagram illustrating an example of setting of performing gradient characteristics maintenance near a black point using the panel of a printer body (MFP). As mentioned above, it is also possible to make a setting as described with reference to FIG. 6 using the panel of the printer body. In the case, at Step S801, CPU 1502 communicates with the printer body, and acquires the setting result shown in FIG. 7 from the printer body (in the example in FIG. 15, the color output device 1507).

In case of setting to maintain the gradient characteristics near a black point, CPU 1502 advances to processing of Step S802, and otherwise CPU 1502 advances to processing of Step S808.

At Step S802, CPU 1502 acquires the minimum lightness value (hereinafter referred to as minL_src) of the color gamut corresponding to a set source profile and the minimum lightness value (hereinafter referred to as minL_dst) of the output color gamut. They can be acquired, if the source profile is an ICC profile, by referring to an A2B table (a table which converts a device dependent signal into a device independent (PCS) signal). In addition, PCS is referred to as a profile connection space. Subsequently, CPU 1502 advances to processing of Step S803.

At Step S803, CPU 1502, by comparing minL_src and minL_dst, determines whether the relationship of them with respect to the minimum lightness correction target value (hereinafter referred to as L_correct) set in advance becomes as follows.

$$\mathrm{min}L\_dst - L\_correct \geq \mathrm{min}L\_src \quad (1)$$

Figure 10:
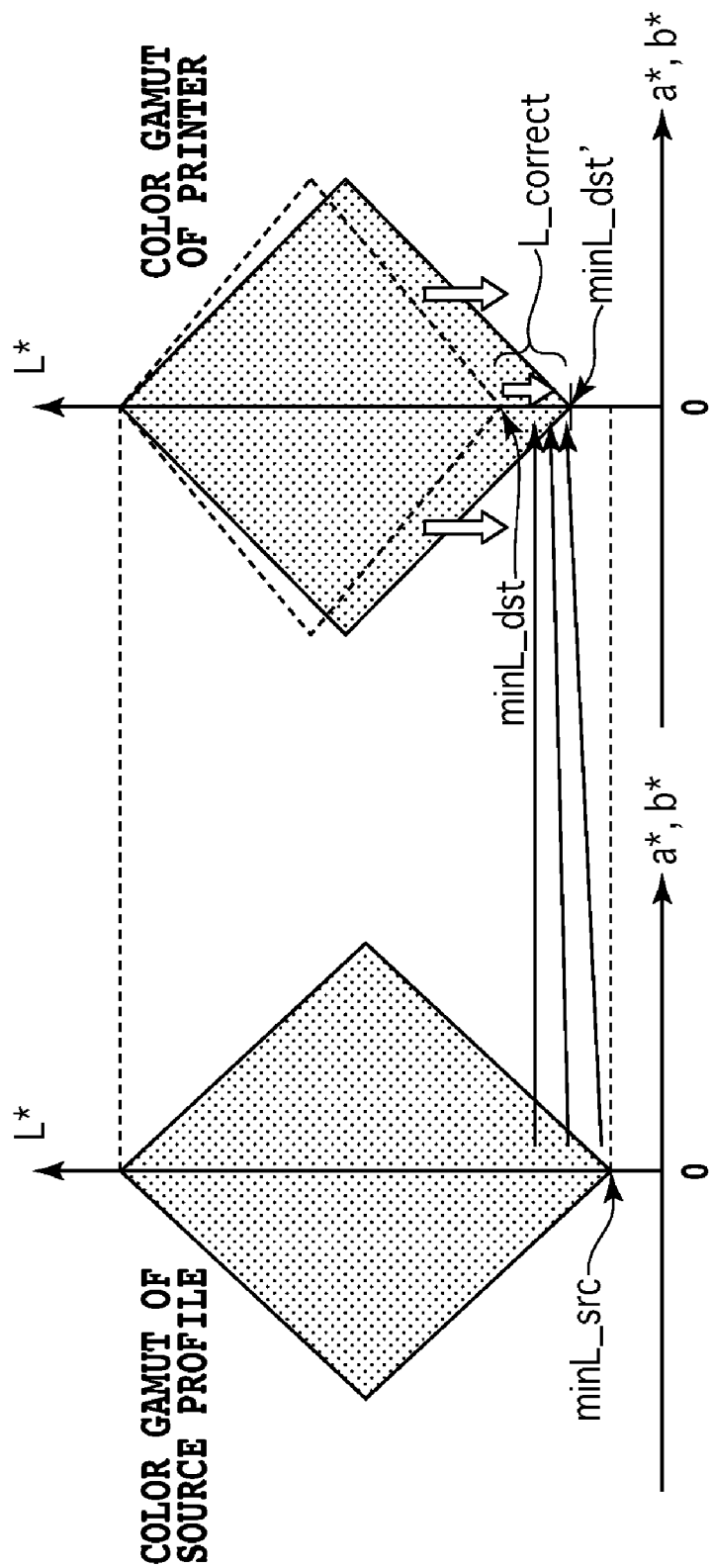
FIG. 10 is a diagram illustrating an image of the correction result of an output color gamut of an embodiment to which the present invention is applicable.

Here, in correction of the minimum lightness value of the output color gamut, a suitable value (a default value) is set for L_correct, by considering to what degree the gradient characteristics near a black point is given priority and to what degree the accuracy of the color reproduction is given priority. The above mentioned formula (1) determines whether or not, when as illustrated in FIG. 10 the minimum lightness value of the output color gamut is corrected to the minimum lightness target correction value, the minimum lightness value of the output color gamut becomes greater than that of the source profile. When this formula holds, CPU 1502 advances to processing of Step S804, and when the minimum lightness value of the output color gamut becomes smaller than that of the source profile, by correction, CPU 1502 advances to processing of Step S808.

At Step S804, CPU 1502 corrects a color conversion table in a destination profile such that the corrected minimum lightness value (hereinafter referred to as Lmin_dst'; target lightness value) of the output color gamut becomes as follows.

minL_dst'=minL_dst−L_correct

The detailed processing will be described later with reference to FIG. 9.

At Step S805, CPU 1502 generates a correction color conversion table in response to the result at Step S804, stores it in a storage part (memory 1503), and advances to processing of Step S806.

At Step S806, CPU 1502 performs color conversion of the input image using the correction color conversion table generated at Step S805, and advances to processing of Step S807.

At Step S808, CPU 1502 performs color conversion of the input image using a usual color conversion table, and advances to processing of Step S807.

At Step S807, CPU 1502 instructs the printer to output an image subjected to color processing, and completes processing.

In addition, when the source profile is switched, CPU 1502 restarts processing from the processing of Step S802, and re-generates a correction color conversion table. Moreover, when a correction level is reset from UI as in FIG. 12, the correction color conversion table is also re-generated, similarly.

FIG. 14 is a diagram illustrating the flow of processing of an image data during color matching. If RGB data or CMYK data is input into a color image processing system, the image data is subjected to color matching through a source profile and a destination profile, and output as C'M'Y'K' data. In case of a usual color conversion processing (Step S808), the image data is processed using a color conversion table in the destination profile. However, when correction is performed according to the present embodiment (Step S806), color conversion is performed not using the destination profile but using the correction color conversion table.

Figure 9:
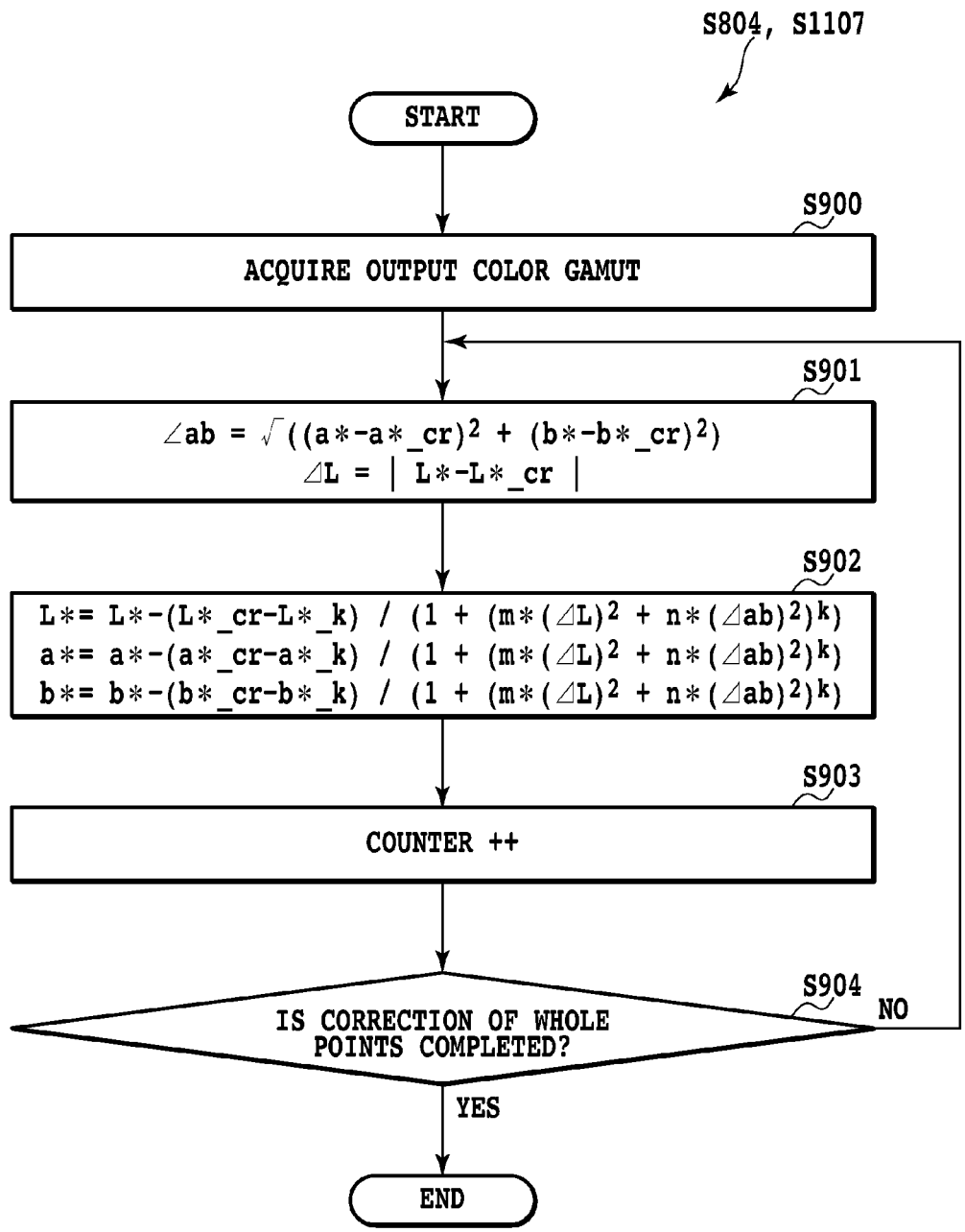
FIG. 9 is a flowchart of processing of correcting an output color gamut in Step S804, according to an embodiment to which the present invention is applicable.

FIG. 9 is a flow chart illustrating the details of correction processing of an output color gamut at Step S804 (and Step S1107 to be described later). Now, with reference to FIG. 9, as an example of methods for correcting a color gamut, a method for correcting by weighting with the distance from the corrected minimum lightness point will be described.

At Step S900, CPU 1502 acquires a plurality of chromaticity of a certain grid in the output color gamut.

At Step S901, CPU 1502 calculates the difference between the chromaticity point in an output color gamut before correction and the chromaticity point to be the minimum lightness value after correction. The difference Δab between the chromaticity a*, b* of the certain grid in the output color gamut before correction and the chromaticity a*_cr, b*_cr of the minimum lightness point after correction can be obtained by the following formula.

$$\Delta ab = \sqrt{((a^*-a^*\_cr)^2+(b^*-b^*\_cr)^2)}$$

Moreover, the difference ΔL between the lightness L* of the certain grid in the output color gamut before correction and the lightness L*_cr of the minimum lightness point after correction is obtained by the following formula.

$$\Delta L = |L^*-L^*\_cr|$$

Where, L*_cr can be represented as follows.

L*_cr=minL_dst−L_correct (target lightness value)

Subsequently, CPU 1502 advances to processing of Step S902.

At Step S902, CPU 1502 corrects each of the chromaticity points by weighting ΔL and Δab. Examples of calculation formula are as follows.

$$L^* = L^* - (L^*\_cr - L^*\_k)/\sqrt{((1+(m\times(\Delta L)^2+n\times(\Delta ab)^2)^k)}$$

$$a^* = a^* - (a^*\_cr - a^*\_k)/\sqrt{((1+(m\times(\Delta L)^2+n\times(\Delta ab)^2)^k)}$$

$$b^* = b^* - (b^*\_cr - b^*\_k)/\sqrt{((1+(m\times(\Delta L)^2+n\times(\Delta ab)^2)^k)}$$

Where, L*_k indicates the lightness of the minimum lightness point before correction, and a*_k and b*_k indicate the chromaticity of the minimum lightness point before correction. Moreover, m and n are weighting coefficients, and according to the Gamut shape of the printer, are substituted by suitable values.

At Step S903, CPU 1502 advances a counter number by one and advances to processing of Step S904.

At Step S904, CPU 1502 confirms whether or not correction with respect to all grids constituting the Gamut of the printer is completed (whether the counter number reaches to the total grid number or not), and if the correction is completed, completes processing. If the correction is not completed, CPU 1502 advances to processing of Step S901, and repeats the above mentioned processing.

According to the present embodiment, when there is a difference between the minimum lightness points of the source profile and the output color gamut, depending on a user application, color conversion can be performed by selecting the optimal one of putting emphasis on gradient characteristics near a black point and putting emphasis on color difference with respect to the source. Moreover, since the correction color conversion table is configured to be updated as needed by the set source profile and correction level, it is not necessary to retain the color conversion tables corresponding to a plurality of source profiles in advance.

Moreover, the present embodiment is also effective when, in a system where a plurality of MFPs is present on a network as in FIG. 4, the same image data indicated by the same source profile is output by a plurality of printers each having different output characteristics. In other words, since, also in the system as in FIG. 4, an optimal level correction is performed by the source profile and each of the output color gamuts, it is possible to obtain an output image having the same impression with regard to the gradient characteristics near a black point.

Second Embodiment

In the present embodiment, instead of a method where as the above mentioned first embodiment, a user intentionally sets with regard to the gradient characteristics near a black point, a method where automatic and optimal correction processing is performed by the type of a profile, setting of gray compensation, and attributes of an input image, will be described. Difference from the first embodiment is in main processing procedures illustrated in FIG. 11, and methods of the correction color conversion table generation processing of FIG. 9 and the other processing are the same as those of the first embodiment.

<Description of Operation>

Figure 11:
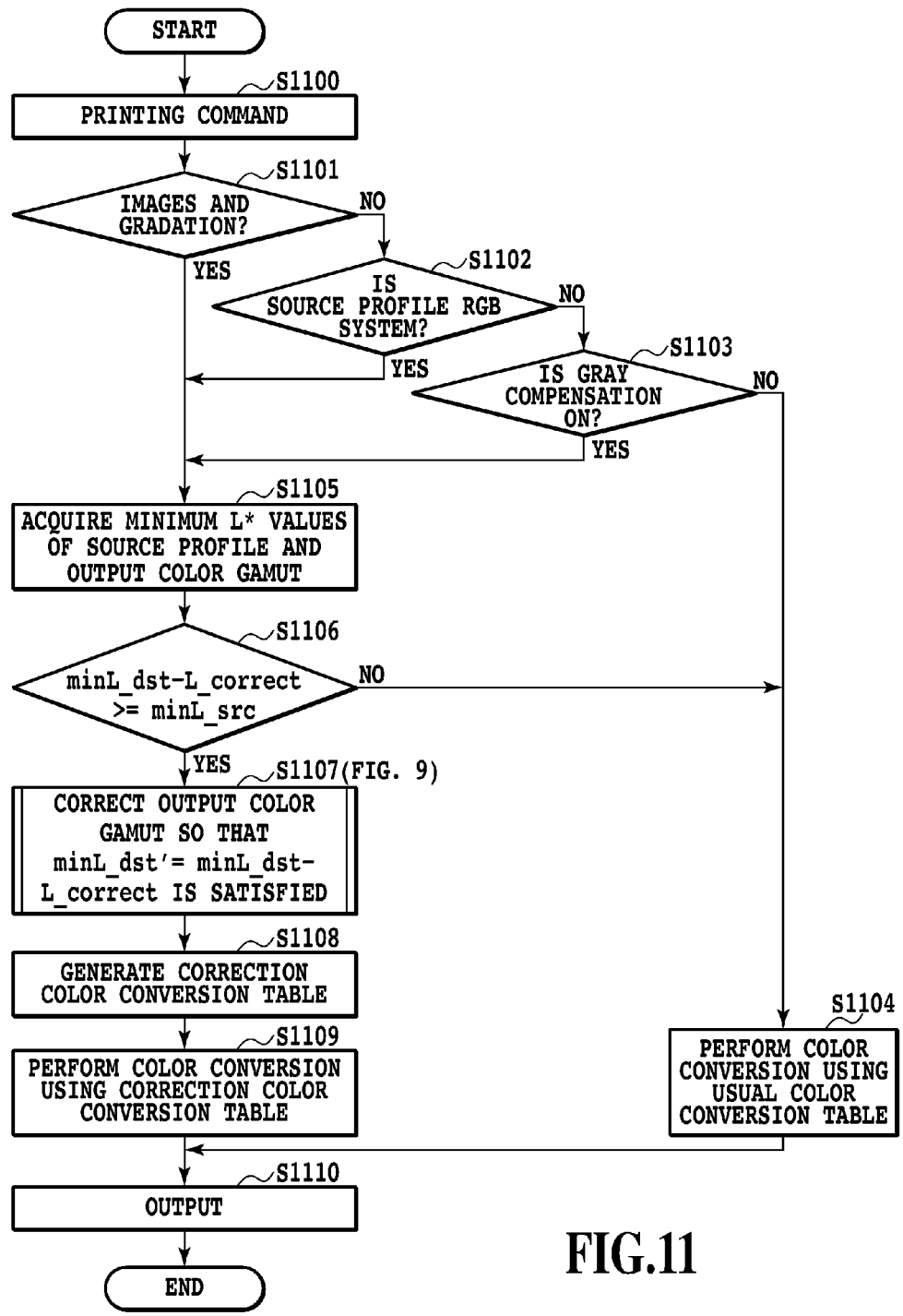
FIG. 11 is a flow chart of main processing of a second embodiment to which the present invention is applicable.

FIG. 11 is a main flow chart illustrating the color conversion processing of a color image processing system of the present embodiment. The processing procedure illustrated in FIG. 11 is performed such that CPU 1502 of the host computer 1501 in FIG. 15 mentioned above reads out and executes color profile generation utility program loaded on the memory 1503.

At Step S1100, CPU 1502 sends a printing command to a printer (color MFP46a or 46b) having a configuration as in FIGS. 1, 2 and 3, and advances to processing of Step S1101.

At Step S1101, CPU 1502 determines the attributes belonging to the data of an input image. When the attributes are an image or gradation, CPU 1502 advances to processing of Step S1105. Otherwise, CPU 1502 advances to processing of Step S1102.

At Step S1102, whether or not the set source profile is an RGB-system profile which is used when the input image is an image in an RGB space, is determined. When the source profile is an RGB-system profile, CPU 1502 advances to processing of Step S1105, and when the source profile is a CMYK-system profile which is used when the input image is an image in a CMYK space, CPU 1502 advances to processing of Step S1103.

At Step S1103, CPU 1502 refers to the setting etc. of the property of the printer and determines whether or not, when printing command is performed, the setting of gray compensation ON is made. In case of gray compensation ON, CPU 1502 advances to processing of Step S1105, and otherwise, CPU 1502 advances to processing of Step S1104.

Although processing of the following steps S1104 to S1110 are the same as that of steps S802 to S808 in FIG. 8, the outline thereof will be described.

At Step S1104, CPU 1502, using a usual color conversion table in a destination profile, performs color conversion of the input image, and advances to processing of Step S1110.

On the other hand, at Step S1105, CPU 1502 acquires the minimum lightness value (hereinafter referred to as minL_src) of the color gamut corresponding to the set source profile and the minimum lightness value (hereinafter referred to as minL_dst) of the output color gamut. They can be acquired by referring to an A2B table if an ICC profile is used. Subsequently, CPU 1502 advances to processing of Step S1106.

At Step S1106, CPU 1502, by comparing minL_src and minL_dst, determines whether the relationship of them with respect to the minimum lightness correction target value (hereinafter referred to as L_correct) set in advance becomes as follows.

$$minL\_dst - L\_correct \geq minL\_src \quad (1)$$

Where, a suitable value is set for L_correct, by considering the balance of the minimum lightness value of the output color gamut, the gradient characteristics near a black point, and the color reproduction accuracy. The above described formula (1) determines whether or not, when as illustrated in FIG. 10, the minimum lightness value of the output color gamut is corrected to the minimum lightness target correction value, the minimum lightness value of the output color gamut becomes greater than that of the source profile. When this formula holds, CPU 1502 advances to processing of Step S1107, and when, by correction, the minimum lightness value of the output color gamut becomes smaller than that of the source profile, CPU 1502 advances to processing of Step S1104.

At Step S1107, CPU 1502 corrects the color conversion table so that the minimum lightness value of the output color gamut after correction (hereinafter referred to as Lmin_dst'; target lightness value) becomes as follows.

$$minL\_dst' = minL\_dst - L\_correct$$

The detailed processing is the same as the above description with reference to FIG. 9.

At Step S1108, CPU 1502 generates a correction color conversion table in response to the result at Step S1107, stores it in a storage part (memory 1503), and advances to processing of Step S1109.

At Step S1109, CPU 1502 performs color conversion of the input image using the correction color conversion table generated at Step S1108, and advances to processing of Step S1110.

At Step S1110, CPU 1502 instructs the printer to output an image subjected to color processing, and completes processing.

According to the present embodiment, with regard to the gradient characteristics near a black point, depending on the type of a profile, setting of gray compensation, and the attributes of the input image, automatic switching of setting can be performed.

In addition, with regard to the type of the profile, the above mentioned embodiment is configured to perform correction processing when an RGB-system profile where the minimum lightness value is surely set to $L^* = 0$ at a default is input. However, since even for CMYK-system profiles some of them have also low minimum lightness points, the determination method is not limited to the method mentioned above. Moreover, with regard to setting of gray compensation, since the minimum lightness value at setting of gray compensation ON tends to be high, the determination method as mentioned above is used, however, depending on output color reproduction properties, it is also possible to use a determination method where correction is performed even at gray compensation OFF. Moreover, with regard to the attributes of the input image, setting is made so that images and gradations, where gradient characteristics are important in particular, are subjected to correction processing, however, depending on the purpose and the output color gamut of the printer, it is also possible to use a determination method where other attributes are also corrected.

Further, in the above mentioned embodiment, although depending on the type of the profile, setting of gray compensation, the attributes of the input image, whether or not correction processing is performed is determined, it is also possible to gradually adjust the extent of correction like the example of UI in FIG. 12. FIG. 13 is a table showing an example of a correction table determining L_correct, and is referred to during processing based on the setting in FIG. 12.

Moreover, it is also possible, by performing the processing of steps S1105 and S1106 before Step S1101, to determine the presence or absence of correction depending on the result of comparison between the minimum lightness values of the source profile and the output color gamut. Specifically, it should be set "if S1106 is NO, advance to S1104" and "if S1106 is YES, advance to S1101".

Other Embodiments

Other than the above mentioned embodiments, the following modes can be performed.

(1) In above-mentioned embodiments, although hardware etc. constituting a network is contained, the above-mentioned embodiments can also be achieved even by software which sequentially performs each data processing. In other words, storage medium (or recording medium) in which a program code of software which achieves the functions of the above-mentioned embodiments are recorded is supplied to a system or a device. In addition, it should be appreciated that the functions of the above-mentioned embodiments can also be achieved by the computer (or CPU and MPU) of the system or the device, which reads out and executes the program code stored in the storage medium. In the case, the program code itself, read out from the storing medium will achieve the functions of the above mentioned embodiments, and the program code can be written in various storage media, such as a CD, an MD, a memory card, and an MO.

Moreover, not only the functions of the above mentioned embodiments can be achieved by executing the program code read out by the computer. In other words, it should be appreciated that a case in which the functions of the above mentioned embodiments are achieved by processing of an operating system (OS) etc. which runs on the computer based on the instruction of the program code and performs a part or the whole of the practical processing, is also included.

Further the program code read out from the storage medium is written in a memory provided to a function expansion card inserted in the computer or a function expansion unit connected to the computer. It should be appreciated that a case in which the functions of the above mentioned embodiments are achieved by processing of CPU etc. provided to the function expansion card or the function expansion unit, which, based on the instruction of the program code, performs a part or the whole of the practical processing, is also included.

(2) In the above mentioned embodiments, the processing procedures illustrated in FIG. 8 or FIG. 11 are performed by CPU 1502 of the host computer 1501 in FIG. 15 mentioned above, which reads out and executes a color profile generation utility program loaded on the memory 1503.

However, parts of the processing may be performed by the printer (MFP). They are the processing procedures of, such as steps S801, S806 and S808 in FIG. 8 and steps S1101, S1102, S1103, S1109 and S1104 in FIG. 11. They maybe performed by the MFP controller 18 reading out and executing a control program stored in the memory part 19. In the case, the printer (MFP) should also have necessary data (color conversion table and others) in advance. Alternatively, before and after the steps S801, S806 and S808 and the steps S1101, S1102, S1103, S1109 and S1104, necessary data and various instruction commands etc. should be communicated between CPU 1502 and the MFP controller 18. These modified modes will be easily understandable for a person skilled in the art.

(3) In addition, each of the above mentioned embodiments is merely exemplified as an embodying example during performing the present invention, thereby, the technical scope of the present invention should not be understood in a limited manner by the embodiments. In other words, the present invention can be performed in various ways without departing from its technical idea and its main aspects.

Effect of Embodiments

As described above, according to the present embodiments, as a first aspect, the color image processing system (1501) which can perform color conversion processing includes the following functions. That is, the color image processing system includes an output condition determining means (1502; S801, and S1101 to S1103) for determining setting or output conditions and a minimum lightness value comparing means (1502; S803 and S1106) for comparing the minimum lightness value of a source profile and that of an output color gamut. Further, the color image processing system includes a correction color conversion table generating means for generating a color conversion table by correcting the output color gamut, when the determination result of the output condition determining means and the comparison result of minimum lightness value comparing means, determine that it is necessary to generate the color conversion table. The correction color conversion table generating means is denoted as (1502; S802 to S805, and S1107 to S1108). Moreover, the color image processing system includes a color conversion processing means (1502; S806, S808, S110 and S1104) for performing color conversion processing by selectively using a usual color conversion table and the correction color conversion table depending on the determination result by the output condition determining means or the comparison result of the minimum lightness value comparing means.

In addition, reference numerals etc. in figures in the embodiments corresponding to constituent elements in claims are indicated in parenthesis ( ). However, the constituent elements described in the claims are not limited to the constituent elements of the embodiments in the parenthesis ( ) parts.

Here, as a second aspect, the correction color conversion table generating means has the following functions. That is, by correcting a chromaticity point having minimum lightness value to a target lightness value set in advance (S901), and thereby weighting brightness and color saturation (S902), the output color gamut is corrected while keeping the balance of the whole of the output color gamut (S804 and S1107, in FIG. 9).

Moreover, as a third aspect, in the first mode, the output condition determining means has the following functions. That is, an aspect can be included, where, depending on the setting by a user indication, accepted by an input means (a user interface of a printer or a touch panel of an image forming apparatus etc.), the usual color conversion table is selectively used (1502; S801).

Moreover, as a fourth aspect, an aspect can be included, where, in the first mode, depending on the output condition, the output condition determining means can automatically and selectively use the usual color conversion table (1502; S1101 to S1103).

Moreover, as a fifth aspect, an aspect can be included, where, in the second aspect, the target lightness value is set in accordance with the minimum lightness value (S901) or the shape (S 902) of the output color gamut.

Moreover, as a sixth aspect, an aspect can be included, where, in the second aspect, a table (FIG. 13) is retained, in which, so that correction levels can be selected with regard to the target lightness value, a parameter (L_correct) specifying a plurality of target lightness value is set.

Moreover, as a seventh aspect, an aspect can be included, where, in the fourth aspect, the output condition includes information of the attributes of an input image, setting of gray compensation, or the type of a source profile (S1101 to S1103).

Moreover, as an eighth aspect, an aspect can be included, where, in the first aspect, by means of changing the source profile or re-setting the correction levels, by sequentially starting the minimum brightness value comparing means and the correction color conversion table generating means, the correction color conversion table is re-generated.

Moreover, as a ninth aspect, in the first aspect, where, when the same source profile and the same image with regard to a plurality of color image forming apparatuses which are connected on a network and can perform color conversion processing, are input, the following functions are included. In other words, an aspect can be included, where using the relationship between the minimum lightness points of the output color gamut of each of the color image forming apparatuses and the source profile, by generating the correction color conversion table of each of the color image forming apparatuses, correction is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-097713, filed Apr. 3, 2007, which is hereby incorporated by reference herein in its entirety.

What is claimed is:

1. A color image processing system for color conversion processing, the color image processing system comprising:
an output condition determining means for determining a presence or absence of an instruction for gradation correction near a dark spot from an operational part of the color image processing system;
a minimum lightness value comparing means for comparing a minimum lightness value of a color gamut corresponding to a source profile and a minimum lightness value of an output color gamut;
a correction color conversion table generating means for generating a correction color conversion table for correcting the output color gamut if the output condition determining means determines the presence of the instruction and if the minimum lightness value comparing means indicates that a difference between the minimum lightness value of the color gamut corresponding to the source profile and the minimum lightness value of the output color gamut is greater than a given value; and
a color conversion processing means for performing color conversion processing, based on whether the output condition determining means determines the presence or absence of the instruction or a comparison result by the minimum lightness value comparing means, by selectively using a color conversion table or the correction color conversion table,
wherein the correction color conversion table generating means does not generate the correction color conversion table for correcting the output color gamut, even if the output condition determining means determines the presence of the instruction, if the minimum lightness value comparing means indicates that the difference between the minimum lightness value of the color gamut corresponding to the source profile and the minimum lightness value of the output color gamut is less than the given value.

2. The color image processing system according to claim 1, wherein the correction color conversion table generating means corrects a chromaticity point with a minimum lightness value to a target lightness value set in advance, and corrects the output color gamut based on the correction.

3. The color image processing system according to claim 1, wherein a user indication is input in the operational part.

4. The color image processing system according to claim 1, wherein the output condition determining means, depending on an output condition, automatically and selectively uses the color conversion table or the correction color conversion table.

5. The color image processing system according to claim 2, wherein the target lightness value is set in accordance with the minimum lightness value or a shape of the output color gamut.

6. The color image processing system according to claim 2, wherein a table is retained, in which a parameter specifying a plurality of target lightness values is set so that a correction level is selectable for the target lightness value.

7. A color image processing system for color conversion processing, the color image processing system comprising:
an output condition determining means for determining an output condition including attribute information of an input image, setting of gray compensation, or a type of source profile;
a minimum lightness value comparing means for comparing a minimum lightness value of a color gamut corresponding to a source profile and a minimum lightness value of an output color gamut;
a correction color conversion table generating means for generating a correction color conversion table for correcting the output color gamut, if the output condition determining means determines that the attribute information of the input image is an image or gradation, or the setting of gray compensation is on, or the source profile is a RGB-system profile, and if the minimum lightness value comparing means indicates that a difference between the minimum lightness value of the color gamut corresponding to the source profile and the minimum lightness value of the output color gamut is greater than a given value; and
a color conversion processing means for performing color conversion processing, based on the output condition determined by the output condition determining means or a comparison result by the minimum lightness value comparing means, by selectively using a color conversion table or the correction color conversion table,
wherein the correction color conversion table generating means does not generate the correction color conversion table for correcting the output color gamut, even if the output condition determining means determines that the attribute information of the input image is an image or gradation, or the setting of gray compensation is on, or the source profile is a RGB-system profile, if the minimum lightness value comparing means indicates that the difference between the minimum lightness value of the color gamut corresponding to the source profile and the minimum lightness value of the output color gamut is less than the given value.

8. The color image processing system according to claim 1, wherein the correction color conversion table is regenerated by changing a source profile or re-setting a correction level, sequentially with the minimum lightness value comparing means and the correction color conversion table generating means.

9. The color image processing system according to claim 1, wherein when the same source profile and the same image with regard to a plurality of color image forming apparatuses, which are connected on a network and perform color conversion processing, are input, using the relationship between the minimum lightness value of the output color gamut of each of the plurality of color image forming apparatuses and the minimum lightness value of the color gamut corresponding to the source profile, the correction color conversion table of each of the plurality of color image forming apparatuses is generated and corrected.

10. A color image processing method for a color image processing system for color conversion processing, the color image processing method comprising:
an output condition determination step of determining presence or absence of an instruction for gradation correction near a dark spot from an operational part of the color image processing system;

a minimum lightness value comparing step of comparing a minimum lightness value of a color gamut corresponding to a source profile and a minimum lightness value of an output color gamut;

a correction color conversion table generating step of generating a correction color conversion table for correcting the output color gamut, if the output condition determining step determines the presence of the instruction and if the minimum lightness value comparing step indicates that a difference between the minimum lightness value of the color gamut corresponding to the source profile and the minimum lightness value of the output color gamut is greater than a given value; and a color conversion processing step of performing color conversion processing, based on whether the output condition determining step determines the presence or absence of the instruction or a comparison result by the minimum lightness value comparing step, by selectively using a color conversion table or the correction color conversion table, wherein the correction color conversion table generating step does not generate the correction color conversion table for correcting the output color gamut, even if the output condition determining step determines the presence of the instruction, if the minimum lightness value comparing step indicates that the difference between the minimum lightness value of the color gamut corresponding to the source profile and the minimum lightness value of the output color gamut is less than the given value.

11. The color image processing method according to claim 10, wherein, the correction color conversion table generation step corrects a chromaticity point with a minimum lightness value to a target lightness value set in advance, and corrects the output color gamut based on the correction.

12. The color image processing method according to claim 10, wherein a user indication is input in the operational part.

13. The color image processing method according to claim 10, wherein the output condition determination step, depending on an output condition, automatically and selectively uses the color conversion table or the correction color conversion table.

14. The color image processing method according to claim 11, wherein the target lightness value is set in accordance with the minimum lightness value or a shape of the output color gamut.

15. The color image processing method according to claim 11, wherein a table is retained, in which a parameter specifying a plurality of target lightness values is set so that a correction levels is selectable with regard to the target lightness value.

16. A color image processing method for a color image processing system for color conversion processing, the color image processing method comprising:

an output condition determining step of determining an output condition including attribute information of an input image, setting of gray compensation, or a type of source profile;

a minimum lightness value comparing step of comparing a minimum lightness value of a color gamut corresponding to a source profile and a minimum lightness value of an output color gamut;

a correction color conversion table generating step of generating a correction color conversion table for correcting the output color gamut, if the output condition determining step indicates that the attribute information of the input image is an image or gradation, or the setting of gray compensation is on, or the source profile is a RGB-system profile, and if the minimum lightness value comparing step indicates that a difference between the minimum lightness value of the color gamut corresponding to the source profile and the minimum lightness value of the output color gamut is greater than a given value; and a color conversion processing step of performing color conversion processing, based on the output condition determined in the output condition determining step or a comparison result in the minimum lightness value comparing step, by selectively using a color conversion table or the correction color conversion table, wherein the correction color conversion table generating step for correcting the output color gamut does not generate the correction color conversion table, even if the output condition determining step determines that the attribute information of the input image is an image or gradation, or the setting of gray compensation is on, or the source profile is a RGB-system profile, if the minimum lightness value comparing step indicates that the difference between the minimum lightness value of the color gamut corresponding to the source profile and the minimum lightness value of the output color gamut is less than the given value.

17. The color image processing method according to claim 10, wherein the correction color conversion table is regenerated by changing source profile or re-setting correction levels, sequentially with the minimum lightness value comparison step and the correction color conversion table generation step.

18. The color image processing method according to claim 10, wherein when the same source profile and the same image with regard to a plurality of color image forming apparatuses, which are connected on a network and perform color conversion processing, are input, using the relationship between the minimum lightness value of the output color gamut of each of the plurality of color image forming apparatuses and the minimum lightness value of the color gamut corresponding to the source profile, the correction color conversion table of each of the plurality color image forming apparatuses is generated and corrected.

19. A non-transitory computer-readable storage medium storing a program, executable by a computer to execute the color image processing method according to claim 10.

* * * * *